Sept. 28, 1937.    N. B. THOMPSON    2,094,258

PIPE LINE CLAMP

Filed June 30, 1936

Inventor
Newton B. Thompson

By Attorney

Patented Sept. 28, 1937

2,094,258

UNITED STATES PATENT OFFICE 2,094,258

PIPE LINE CLAMP

Newton B. Thompson, Waterville, Maine

Application June 30, 1936, Serial No. 88,135

4 Claims. (Cl. 138—99)

My present invention relates to improvements in pipe line clamps.

Water and gas systems present typical problems of pipe line maintenance not only because of the frequency of leaks, but also because of the necessity of effecting all repairs with minimum interference with service. The difficulty of effecting repairs under these conditions are widely recognized and are always present with the result that several attempts have been made to provide a device that could be quickly applied to the pipe to close the leak after the leak had been made accessible.

I limit my discussion of previous attempts to provide an effective seal to the types which, in general, have been followed. One of these utilized sections which were clamped around the pipe while the other was essentially a sleeve which was slipped over the leak after the pipe had been cut. In both of these types, the difficulty of providing effective annular seals was experienced, although in the second mentioned type, one piece circular gaskets were used which, with clamping means disposed exteriorly of the gaskets, resulted in a reduction of gasket "blowing" to which advantage the commercial preference of this type may well be attributed. This type, however, is more expensive to manufacture and difficult to install.

In accordance with my analysis of the various factors, I utilize the first mentioned type, that is, I use sections that may be quickly and easily clamped around the leak without cutting the pipe, or, under normal conditions, shutting off the flow of pipe line contents.

The primary purpose of my invention is to provide an effective seal not only between the sections, but also between the sections and the pipe. I effect this, in accordance with my invention, by forming the clamp sections and the gasket sections to establish an annular seal which while retaining the advantages of a divided gasket is more effective than a circular gasket of one piece.

As both the sections of the device and of the gasket are identical and as the gasket sections may be put in place quickly and prior to the application of the clamp to the pipe, the repair of the pipe line may be promptly and easily effected by clamping the gasketed sections around the pipe even if the pipe is under water or the workman inexperienced or incompetent.

In the accompanying drawing I have illustrated an embodiment of my invention from which and from the specification, the effectiveness of my invention in stopping leaks and as a service saddle or tapping sleeve may be readily appreciated.

Figure 1:
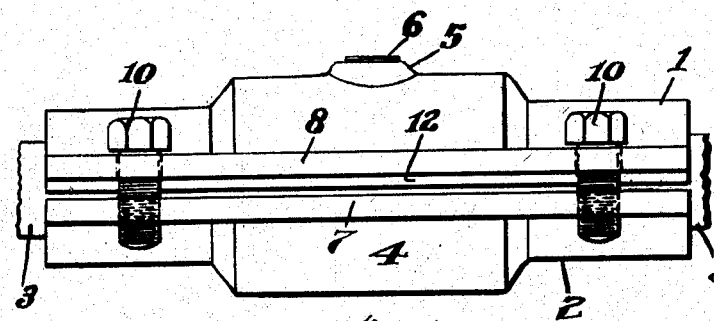
Fig. 1 is a view of my device installed.

My clamp consists of two half sections 1 and 2 which are so shaped that when secured together the resultant end apertures approximate the external diameter of the pipe 3. Preferably, the sections 1 and 2 are formed to provide a chamber indicated at 4 to accommodate couplings.

Either one or both of the sections 1 and 2 may be provided with a tapped hole indicated in the boss 5 into which is threaded a plug, stop cock, or a corporation cock indicated at 6 so that my device may be used as a service saddle or tapping sleeve when desired.

Each of the sections 1 and 2 is provided with flanges 7 and 8, which flanges are provided with tapped holes 9 to receive the clamping bolts 10. The number of bolts used will depend, of course, on the size of the clamp used.

Figure 2:
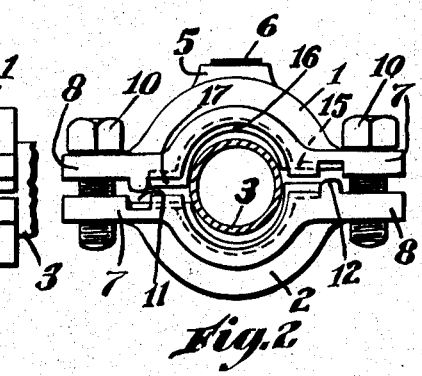
Fig. 2 is an end view of Fig. 1 before the sections are drawn together.
Figure 3:
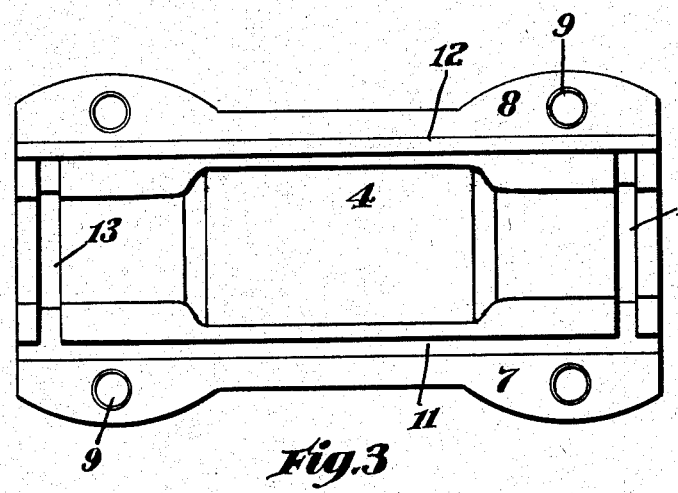
Fig. 3 is a plan view of one of the sections.
Figure 4:
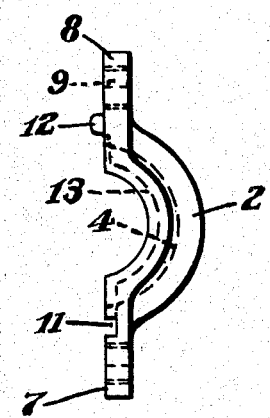
Fig. 4 is an end view of Fig. 3.
Figure 5:
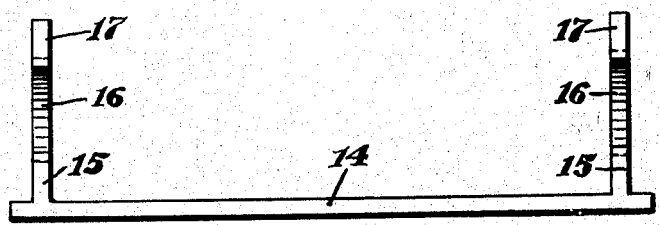
Figs. 5 and 6 are plan and end views representing one of the sections of my novel gasket.

With the possible exception of the boss 5, the sections 1 and 2 are identical. One flange 7 of each section is formed with a groove 11 while the opposite flange 8 is formed with a tongue 12. A pair of grooves 13 near the ends of each section extend from the groove 11 to the tongue 12. When assembled, the sections 1 and 2 are so positioned that the grooves and tongues are in proper relation as shown most clearly in Fig. 2.

My gasket is formed with special attention to the provision of a tight seal. A lead, rubber, or composition gasket (subject, of course, to limitations that may be inherent in particular applications) may be used and may be secured in said grooves as desired.

Figure 6:
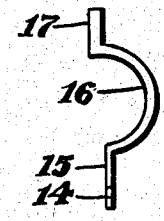

The gasket sections used are preferably identical and consist of a side piece 14 to be lodged in grooves 11 and cross pieces 15 curved or adapted to be curved as at 16 to correspond to the curvature of the grooves 13 while the end portion 17 is adapted to abut the tongue 12. In Fig. 6 it will be noted that the bottom of the portion 17 lies in the same plane as the top of the piece 15 and that while the side piece 14 and the piece 15 are of the same thickness, the curved portion 16 is substantially thicker while the end portion 17 is even of greater thickness.

I have formed my novel gasket in this way so that the portions 14 and 15 will lie within the grooves 11 and 13 respectively while the portions 16 and 17 will protrude from the groove 13 so that the former will contact the pipe 3 while the latter will enter and contact the portion 15 of the other gasket section embedded in the groove 13 of the other section.

In accordance with my invention, it will be appreciated that as the edges of the gasket sections contact within the groove 13 when the bolts are tightened to draw the clamp sections 1 and 2 together, the resultant annular seal is prevented from "blowing" with the result that annular seals may be made as effectively from gasket sections as from a one piece circular gasket. While it is not essential that the gaskets or the clamp sections be identical, the savings in manufacture and the increased simplicity make such construction preferably so that the full advantages of my invention are made available in the effective solution of the problems.

What I therefore claim and desire to secure by Letters Patent is:

1. A device for stopping pipe leaks comprising a pair of sleeve sections each having an elongated recess of substantially semi-circular shape in cross section, means for clamping said sections together in embracing relationship to a pipe, sealing means between said sections at the sides of the recesses therein, said sections having related pairs of spaced apart transverse grooves, said grooves extending beyond the sides of said recesses, and gaskets in said grooves having medial portions for direct sealing engagement with the pipe and terminal portions for sealing contact with each other beyond the sides of the recesses in said sections, the relative depths of said grooves and the terminal portions of said gaskets, beyond the sides of said recesses, being such that each related pair of said terminal portions contact with each other within the groove of one of the sections.

2. A leak stopping device as set forth in claim 1 in which the terminal portions of each of the gaskets are of lesser and greater depths, respectively, than the portions of the groove in which they are accommodated whereby, when the sections are clamped together, the contacting faces of the gasket terminal portions at one side of the device are disposed within the groove of one of the sections and the contacting faces of the gasket terminal portions at the other side of the device are disposed within the groove of the other of the sections.

3. A device for stopping pipe leaks comprising a pair of sleeve sections each having an elongated recess of substantially, semi-circular shape in cross section, means for clamping said sections together in embracing relationship to a pipe, each section having a longitudinally extending groove beyond one side of its recess and a longitudinally extending tongue beyond the other side of its recess, each section additionally having, adjacent to each end thereof, a transverse groove extending from the longitudinal groove to the tongue, said sections being substantially duplicates of each other for disposal relative to each other with their transverse grooves alined and the tongue of each section alined with the longitudinally extending groove of the other section, and a gasket for each section, each gasket comprising a single longitudinal portion to lie within the longitudinally extending groove of the related section and a pair of transverse portions extending laterally from said longitudinal portion to be within the transverse grooves, respectively, of the related section, each transverse gasket portion including a medial portion of substantially semi-circular shape and of greater depth than the portion of the transverse groove in which it is accommodated to contact directly with the pipe, each transverse gasket portion further including a pair of terminal portions to extend beyond the sides of the recess in the related section, the relative depths of said transverse gasket terminal portions and the transverse grooves beyond the sides of the recesses in the sections being such that each related pair of said transverse gasket terminal portions contact with each other within the related portion of the related transverse groove of one of the sleeve sections.

4. A leak stopping device as set forth in claim 3 in which the terminal portions of each transverse gasket portion are of lesser and greater depths, respectively, than the portions of the transverse groove in which they are accommodated.

NEWTON B. THOMPSON.